United States Patent
Ben-Yehuda et al.

(10) Patent No.: US 7,600,093 B2
(45) Date of Patent: Oct. 6, 2009

(54) DEVICE, METHOD AND COMPUTER PROGRAM PRODUCT FOR MULTI-LEVEL ADDRESS TRANSLATION

(75) Inventors: Shmuel Ben-Yehuda, Haifa (IL); Orran Yaakov Krieger, Newton, MA (US); Jon David Mason, Austin, TX (US); James Xenidis, Carmel, NY (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 11/623,468

(22) Filed: Jan. 16, 2007

(65) Prior Publication Data

US 2008/0172543 A1    Jul. 17, 2008

(51) Int. Cl.
*G06F 12/00* (2006.01)
(52) U.S. Cl. .................... 711/203; 711/202
(58) Field of Classification Search ............ None
See application file for complete search history.

(56) References Cited

U.S. PATENT DOCUMENTS

| | | | |
|---|---|---|---|
| 6,578,122 B2 * | 6/2003 | Beukema et al. ............ 711/163 |
| 6,658,521 B1 | 12/2003 | Biran et al. |
| 6,662,242 B2 | 12/2003 | Holm et al. |
| 6,704,831 B1 | 3/2004 | Avery |
| 6,895,491 B2 | 5/2005 | Kjos et al. |
| 7,003,586 B1 * | 2/2006 | Bailey et al. ............... 709/250 |
| 7,461,232 B2 * | 12/2008 | Nicolai ....................... 711/207 |
| 2002/0124148 A1 * | 9/2002 | Beukema et al. ............ 711/163 |
| 2004/0010563 A1 * | 1/2004 | Forte et al. ................. 709/215 |
| 2006/0026383 A1 | 2/2006 | Dinechin et al. |
| 2008/0155224 A1 * | 6/2008 | Crandall et al. ............. 711/203 |
| 2008/0263313 A1 * | 10/2008 | Hepkin ....................... 711/204 |

OTHER PUBLICATIONS

Muli Ben-Yehuda et al., "Utilizing IOMMUs for Virtualization in Linux and Xen", Linux Symposium, Ottawa, 2006 http://developer.amd.com/assets/IOMMU-ben-yehuda.pdf.
Disco: Running Commodity Operating Systems on Scalable Multi-processors (*Source*: http://www-flash.stanford.edu/~bugnion/Disco/sosp-html/), Jan. 16, 2007.
I/O Virtualization and AMD's IOMMU (*Source*: http://www.devx.com/amd/Article/32146), Aug. 9, 2006.

* cited by examiner

*Primary Examiner*—Jack A Lane

(57) ABSTRACT

A method for retrieving information from a storage unit, the method includes: receiving, by an input output memory management unit second-level translation information representative of a partition of a storage unit address space; receiving, by a input output memory management unit, a direct memory access request that comprises a consumer identifier and a second memory address that was first-level translated by a communication circuit translation entity; performing, by the input output memory management unit, a second-level translation of the second memory address such as to provide a third memory address, in response to the identity of the consumer; and accessing the storage unit using the third memory address.

25 Claims, 4 Drawing Sheets

200

400

DEVICE, METHOD AND COMPUTER PROGRAM PRODUCT FOR MULTI-LEVEL ADDRESS TRANSLATION

FIELD OF THE INVENTION

The present invention relates to a method, a device and a computer program product for multi-level address translation.

BACKGROUND OF THE INVENTION

Multi-level address translations are required in computer systems that can support software entities of different types such as a hypervisor, operating systems and applications or other processes that are executed on top of the operating systems.

Typically, a storage unit defines a machine (or physical) address space, each operating system has its own pseudo physical (or guest physical) address space and each application has its own virtual address space.

Each of these software entities can be a consumer that can cause a communication circuit or a requesting device to generate a direct memory access request. The direct memory access request includes a virtual memory address that should be translated (by a multi-level address translation process) to a machine address.

There is a need to provide efficient methods, computer program products and system for effectively responding to error events.

SUMMARY OF THE PRESENT INVENTION

A method for performing a multi-level address translation, the method includes: performing, by a communication circuit translation entity, a first-level translation of a first memory address such as to provide a second memory address, in response to an identity of a consumer that is associated with a direct memory access request that is associated with the first memory address; and performing, by an input output memory management unit, a second-level translation of the second memory address such as to provide a third memory address, in response to the identity of the consumer associated with the direct memory access request.

Conveniently, the performing, by the communication circuit translation entity, the first-level translation of the first memory address includes translating a virtual memory address to a pseudo physical address.

Conveniently, the performing, by the input output memory management unit, the second-level translation of the second memory address includes translating the pseudo physical memory address to a machine physical address.

Conveniently, the direct memory access request includes a legacy memory address field and a legacy consumer identifier field and wherein the stage of performing a second-level translation is preceded by allocating a portion of the legacy address field for identifying the consumer.

Conveniently, the allocating includes allocating at least one bit of a PCI compliant legacy memory address field for identifying the consumer.

Conveniently, the stage of performing a first-level translation is preceded by a stage of allocating a virtual memory space for each consumer.

Conveniently, the stage of performing a first-level translation is preceded by generating the direct memory access request on behalf of the consumer.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Responding to a direct memory access request requires performing a multi-level address translation. The multi-level address translation is split between an input output memory management unit and between communication circuit translation entities. The input output memory management unit performs a second-level address translation and the communication circuit translation entities perform a first-level address translation. Conveniently, this split enables to use existing communication circuit translation circuits that are adapted to perform a single translation.

Conveniently, the translation process is aware of the consumer that is associated with the direct memory request. The identity of that consumer is provided by a consumer identifier. In order to support a large number of consumers a portion of a legacy address field (as well as a legacy consumer identifier field) may be allocated for the consumer identifier.

A software entity such as a hypervisor sends to the input output memory management unit second-level translation information. The hypervisor or an operating system may send to the communication circuit translation entities first-level translation information. First-level translation information may include a mapping between virtual memory addresses and pseudo physical memory addresses. The first-level translation information may be a representative of partitions of pseudo physical address spaces. Second-level translation information may include a mapping between pseudo-physical addresses and machine addresses. The second-level translation information may be a representative of a partition of a pseudo physical address space.

Figure 1:
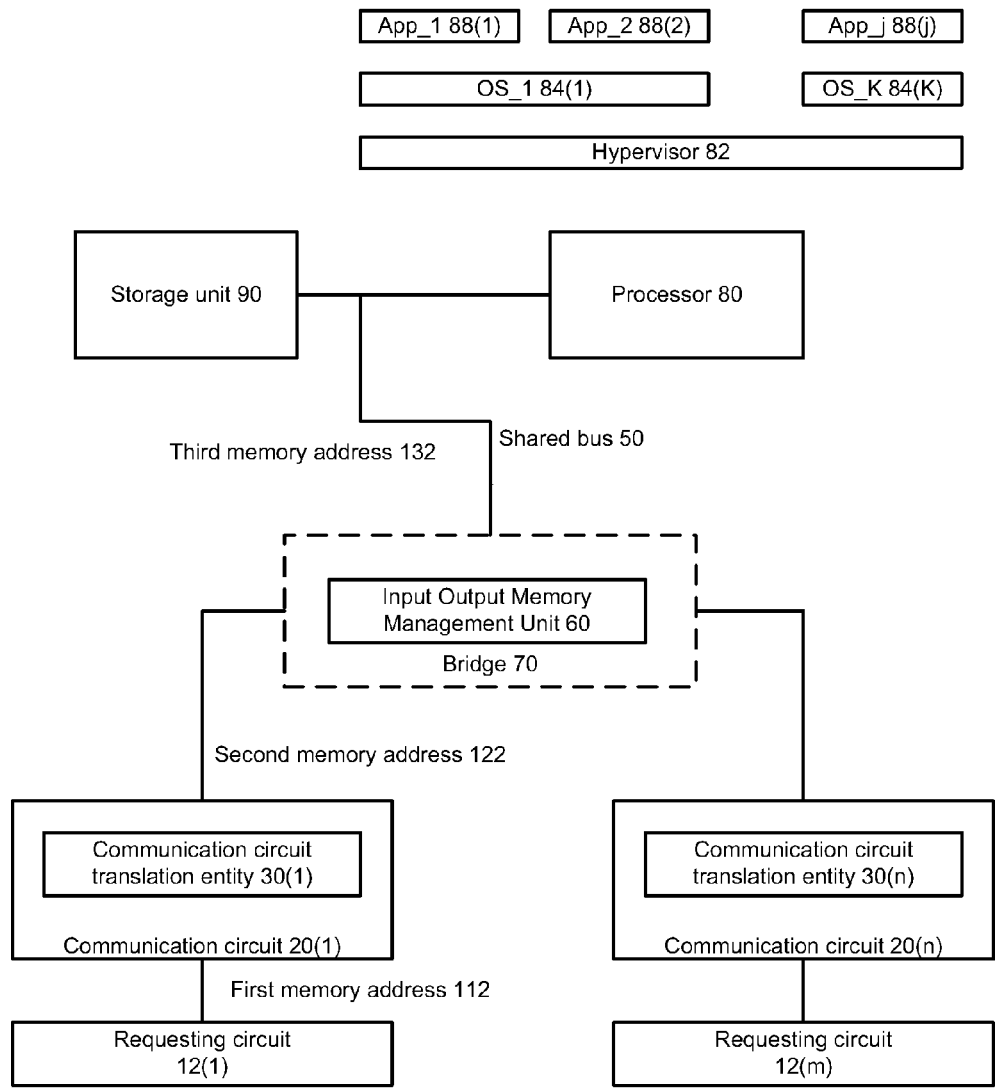
FIG. 1 illustrates a system having error event response capabilities, according to an embodiment of the invention.

FIG. 1 illustrates system 10 according to an embodiment of the invention. System 10 may include multiple communication circuits 20(1)-20(n) that are connected to multiple requesting circuits 12(1)-12(m). Bridge 70 is connected between multiple communication circuits 20(1)-20(n) and shared bus 50. Shared bus 50 is also connected to processor 80 and to storage unit 90.

Each communication circuit may include a communication circuit translation entity. Accordingly, communication circuits 20(1)-20(n) may include communication circuit translation entities 30(1)-30(n) that may be adapted to perform a first-level translation of addresses. Bridge 70 may include input output memory management unit 60 that may be adapted to perform a second-level translation of addresses. Bridge 70 may access storage unit 70 by using addresses that were translated by input output memory management unit 60.

Processor 80 may execute various types of software entities, including hypervisor 82, multiple operating systems OS_1-OS_K 84(1)-84(K) and multiple applications App_1-

Appl_j 88(1)-88(j). Each software entity may be a consumer that may cause a requesting circuit (out of 12(1)-12(m)) or a communication circuit (out of 20(1)-20(n)) to generate a direct memory access request. In other words, a requesting circuit or a communication circuit may generate a direct memory access request on behalf of a consumer.

The direct memory access request includes an address, such as first address 112 and a consumer identifier. First address 112 is illustrated (for simplicity of explanation) as being sent from requesting device 12(1) to communication circuit 20(1). The consumer identifier may identify the consumer that is associated with the direct memory access request. First address 112 is first-level translated by a communication circuit translation entity 30(1) to provide second memory address 122.

A direct memory access request that may include second memory address 122 is sent to input output memory management unit 60 that performs a second-level translation of the second memory address such as to provide third memory address 132 in response to the identity of the consumer. Input output memory management unit 60 may access storage unit 90 using third memory address 132.

Figure 2:
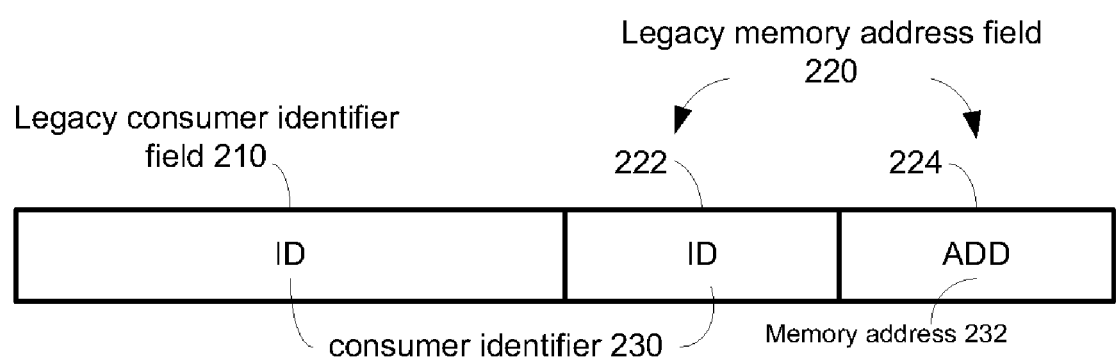
FIG. 2 illustrates a direct address request, according to an embodiment of the invention.

FIG. 2 illustrates direct memory access request 200, according to an embodiment of the invention.

Direct memory access request 200 may include a legacy consumer identifier field 210 and a legacy address field 220. A portion (222) of legacy address field 220 as well as the whole legacy consumer identifier field 210 may be allocated for consumer identifier 230 while another portion (224) of legacy address field 220 are allocated for memory address 232. For simplicity of explanation the bits (or bytes) of consumer identifier 230 are denoted ID while bits (or bytes) of a memory address 232 are denoted ADD.

PCI standard defines a 16 bit long consumer identifier (BDF) that includes a 8-bit bus number, a 5-bit device number and a 3-bit function number. Using a 16-bit long legacy consumer identifier field is limited to $2^{16}$ consumers. When a larger number of consumers should be supported a part of the legacy address field is allocated for the consumer identifier.

Conveniently, input output memory management unit 60 is adapted to determine an identity of a consumer in response to a content of legacy consumer identifier field and in response to a content of a portion of a legacy address field within the direct memory access request.

Conveniently, the direct memory access request may be PCI compliant and input output memory management unit 60 may be adapted to determine an identity of a consumer in response to the content of legacy consumer identifier field and in response to the content of a portion of the PCI compliant address field within the direct memory access request.

Yet according to another embodiment of the invention the input output memory management unit may be indifferent to the partition between consumer identifier 230 and memory address 232 while a host software (hypervisor and, alternatively or additionally operating system) that generates translation information may be aware of the difference between consumer identifier 230 and memory address 232. Conveniently, first-level and/or second level translation information may be generated in response to the difference.

According to an embodiment of the invention hypervisor 82 may generate second-level translation information, send it to input output memory management unit 60 and afterwards cause a requesting device (or even a communication circuit) to generate a direct memory access request that will be processed by using that second-level translation information.

Conveniently, an operating system (such as operating system OS_k 84(k)) may generate first-level translation information, send it to communication circuit translation entities 30(1)-30(n) and afterwards cause a requesting device (or even a communication circuit) to generate a direct memory access request that will be processed by using that first-level translation information. It is noted that the first-level translation information may be sent to communication circuit translation entities 30(1)-30(n) by hypervisor 82.

Figure 3:
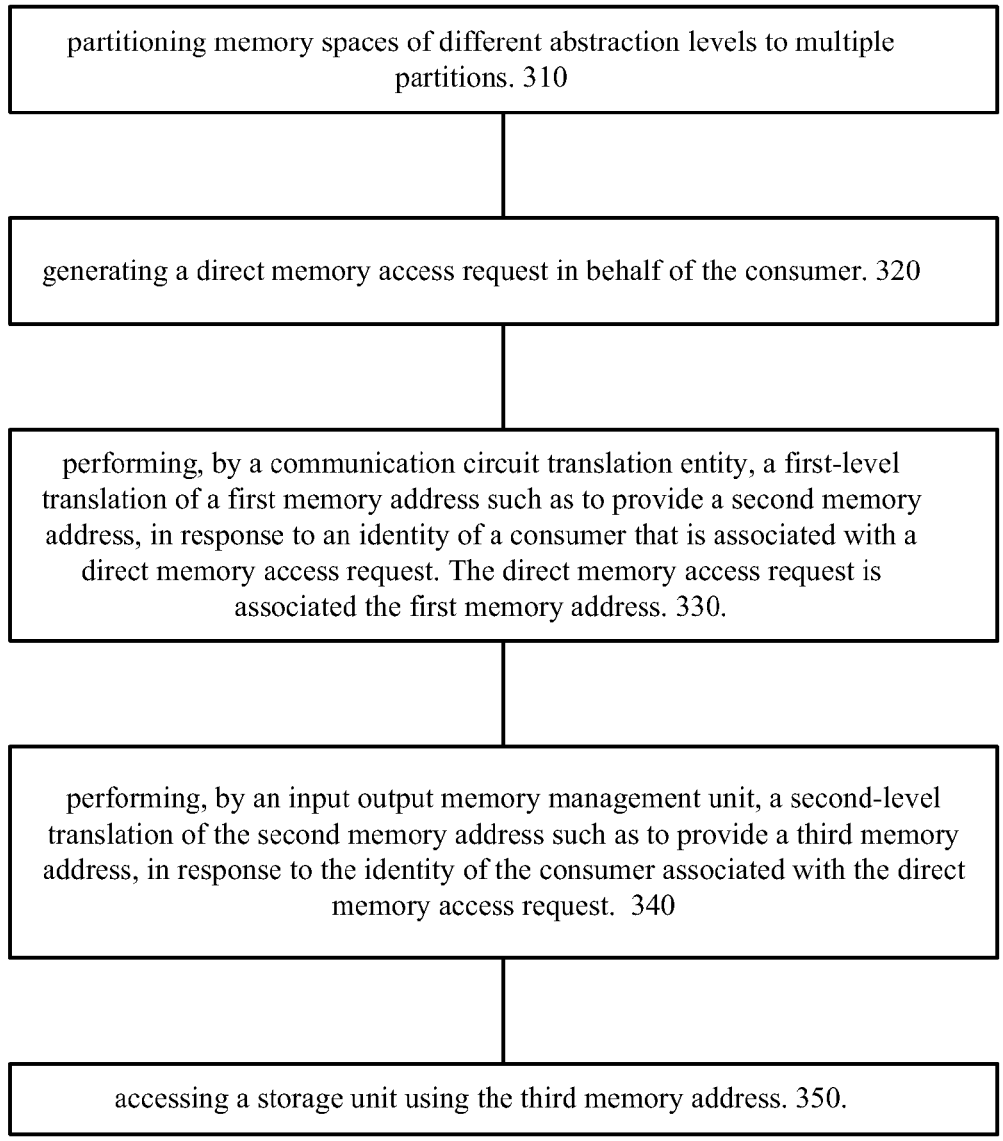
FIG. 3 is a flow chart of a method for performing a multi-level address translation, according to an embodiment of the invention.

FIG. 3 is a flow chart of method 300 for performing a multi-level address translation according to an embodiment of the invention.

Method 300 starts by stage 310 of partitioning memory spaces of different abstraction levels to multiple partitions.

Conveniently, stage 310 includes allocating a memory space partition for each consumer. These memory space partitions may conveniently be non-overlapping. Memory spaces allocated for applications are regarded as virtual memory spaces while memory spaces allocated for operating systems are regarded as pseudo physical (or guest physical) address spaces. The storage unit may define a physical (or machine) memory space.

The mentioned above memory spaces may be characterized by different abstraction (virtualization) levels. It is noted that other memory spaces may be defined and that more than three different abstraction levels may be applied.

Conveniently, a first-level translation may convert a first address (such as a virtual address within a virtual address space) to a second address (such as a pseudo physical address within a pseudo physical address space). The second-level translation conveniently may convert the second address to a third address (such as a machine address within the machine physical address space).

According to an embodiment of the invention stage 310 may include sending translation information representative of the partitions. Conveniently, stage 310 may include sending to an input output memory management unit second-level translation information and sending to communication component translation entities first-level translation information.

Stage 310 is followed by stage 320 of generating a direct memory access request on behalf of the consumer.

Conveniently, the direct memory access request may include a legacy memory address field and a legacy consumer identifier field. Stage 320 may include allocating a portion of the legacy address field for identifying the consumer. This may enable to differentiate between a large number of consumers and especially this may enable to allocate different memory spaces (and different address translation) to each consumer.

For example, a PCI device is identified by a sixteen bit long identifier. By using some of the bits of the PCI address field more than $2^{16}$ different consumers may be supported.

Stage 320 is followed by stage 330 of performing, by a communication circuit translation entity, a first-level translation of a first memory address such as to provide a second memory address, in response to an identity of a consumer that is associated with a direct memory access request that is associated with the first memory address.

Stage 330 is followed by stage 340 of performing, by an input output memory management unit, a second-level translation of the second memory address such as to provide a third memory address, in response to the identity of the consumer associated with the direct memory access request.

Conveniently, stage 330 may include translating a virtual memory address to a pseudo physical address.

Conveniently, stage 340 may include translating the pseudo physical memory address to a machine physical address.

Stage 340 is followed by stage 350 of accessing the storage unit using the third memory address.

Figure 4:
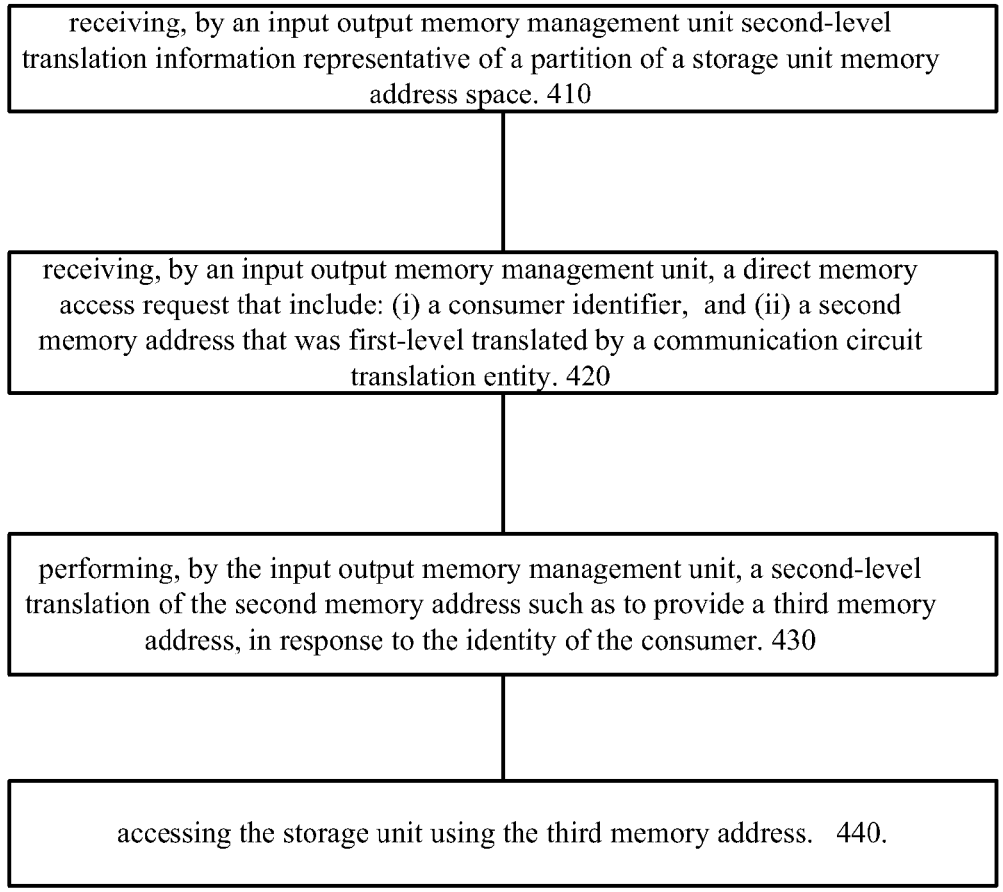
FIG. 4 is a flow chart of a method for retrieving information from a storage unit, according to another embodiment of the invention.

FIG. 4 is a flow chart of method 400 for retrieving information from a storage unit according to an embodiment of the invention.

Method 400 starts by stage 410 of receiving, by an input output memory management unit second-level translation information representative of a partition of a storage unit address space.

Stage 410 may also include allocating a portion of a legacy address field of a direct memory access request for identifying a consumer. Thus, the input output memory management unit will determine the identity of a consumer in response to the content of legacy consumer identifier field and at least one bit of a legacy memory address field. Conveniently, stage 410 may include allocating at least one bit of a PCI compliant legacy memory address field for identifying the consumer.

Stage 410 is followed by stage 420 of receiving, by a input output memory management unit, a direct memory access request that may include a consumer identifier and a second memory address that was first-level translated by a communication circuit translation entity.

Stage 420 is followed by stage 430 of performing, by the input output memory management unit, a second-level translation of the second memory address such as to provide a third memory address, in response to the identity of the consumer.

Conveniently, stage 430 may include translating a pseudo physical memory address to a machine physical address.

Stage 430 is followed by stage 440 of accessing the storage unit using the third memory address.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

According to an embodiment of the invention a computer program product is provided. The computer program product includes a computer usable medium including a computer readable program, wherein the computer readable program when executed on a computer causes the computer to: receive translation information representative of a partition of a storage unit address space; receive a direct memory access request that comprises a consumer identifier and a second memory address that was first-level translated by a communication circuit translation entity; perform a second-level translation of the second memory address such as to provide a third memory address, in response to the identity of the consumer; and access the storage unit using the third memory address.

Conveniently, the computer readable program when executed on a computer causes the computer to translate a pseudo physical memory address to a machine physical address.

Conveniently, the computer readable program when executed on a computer causes the computer to determine an identify of a consumer in response to a content of legacy consumer identifier field and in response to a content of a portion of a legacy address field within the direct memory access request.

Conveniently, the computer readable program when executed on a computer causes the computer to determine an identify of a consumer in response to a content of legacy consumer identifier field and in response to a content of a portion of a PCI compliant address field within the direct memory access request.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method for performing a multi-level address translation, the method comprises:
    performing, by a communication circuit translation entity, a first-level translation of a first memory address such as to provide a second memory address, in response to an identity of a consumer that is associated with a direct memory access request that is associated with the first memory address; and
    performing, by an input output memory management unit, a second-level translation of the second memory address such as to provide a third memory address, in response to the identity of the consumer associated with the direct memory access request.

2. The method according to claim 1 wherein the performing, by the communication circuit translation entity, the first-level translation of the first memory address comprises translating a virtual memory address to a pseudo physical address.

3. The method according to claim 2 wherein the performing, by the input output memory management unit, the second-level translation of the second memory address comprises translating the pseudo physical memory address to a machine physical address.

4. The method according to claim 1 wherein the direct memory access request comprises a legacy memory address field and a legacy consumer identifier field and wherein the stage of performing a second-level translation is preceded by allocating a portion of the legacy address field for identifying the consumer.

5. The method according to claim 4 wherein the allocating comprises allocating at least one bit of a PCI compliant legacy memory address field for identifying the consumer.

6. The method according to claim 1 wherein the stage of performing a first-level translation is preceded by a stage of allocating a virtual memory space for each consumer.

7. The method according to claim 1 wherein the stage of performing a first-level translation is preceded by generating the direct memory access request on behalf of the consumer.

8. A method for retrieving information from a storage unit, the method comprises:
   receiving, by an input output memory management unit second-level translation information representative of a partition of a storage unit address space;
   receiving, by a input output memory management unit, a direct memory access request that comprises a consumer identifier and a second memory address that was first-level translated by a communication circuit translation entity;
   performing, by the input output memory management unit, a second-level translation of the second memory address such as to provide a third memory address, in response to the identity of the consumer; and
   accessing the storage unit using the third memory address.

9. The method according to claim 8 wherein the performing, by the input output memory management unit, the second-level translation of the second memory address comprises translating a pseudo physical memory address to a machine physical address.

10. The method according to claim 8 wherein the direct memory access request comprises a legacy memory address field and a legacy consumer identifier field and wherein the stage of performing the second-level translation is preceded by allocating a portion of the legacy address field for identifying the consumer.

11. The method according to claim 10 wherein the allocating comprises allocating at least one bit of a PCI compliant legacy memory address field for identifying the consumer.

12. A system having multiple-level address translation capabilities, the system comprises:
   a communication circuit translation entity, adapted to perform a first-level translation of a first memory address such as to provide a second memory address, in response to an identity of a consumer that is associated with a direct memory access request that is associated with the first memory address; and
   an input output memory management unit, adapted to perform a second-level translation of the second memory address such as to provide a third memory address, in response to the identity of the consumer associated with the direct memory access request.

13. The system according to claim 12 wherein the communication circuit translation entity is adapted to translate a virtual memory address to a pseudo physical address.

14. The system according to claim 13 wherein the input output memory management unit is adapted to translate the pseudo physical memory address to a machine physical address.

15. The system according to claim 12 adapted to receive a direct memory access request that comprises a legacy consumer identifier field and a legacy address field; wherein a consumer identifier is stored within the legacy consumer identifier field and within a portion of a legacy address field.

16. The system according to claim 15 wherein system is adapted to receive a PCI compliant direct memory access request.

17. The system according to claim 12 further comprising a processor adapted to execute software that allocates a virtual memory space for each consumer.

18. A system having information retrieval capabilities, the system comprises:
   an input output memory management unit adapted to:
      receive translation information representative of a partition of a storage unit address space;
      receive a direct memory access request that comprises a consumer identifier and a second memory address that was first-level translated by a communication circuit translation entity;
      perform, by the input output memory management unit, a second-level translation of the second memory address such as to provide a third memory address, in response to the identity of the consumer; and
      access the storage unit using the third memory address.

19. The system according to claim 18 wherein the input output memory management unit is adapted to translate a pseudo physical memory address to a machine physical address.

20. The system according to claim 18 adapted to receive a direct memory access request that comprises a legacy consumer identifier field and a legacy address field; wherein a consumer identifier is stored within the legacy consumer identifier field and within a portion of a legacy address field.

21. The system according to claim 20 wherein system is adapted to receive a PCI compliant direct memory access request.

22. A computer program product comprising a computer usable storage medium including a computer readable program, wherein the computer readable program when executed on a computer causes the computer to: generate first-level translation information and second-level translation information; send to multiple communication circuit translation entities first-level translation information; send to an input output memory management unit the second-level translation information; cause a generation of at least one direct memory access request that requires first-level and second-level address translation that are responsive to the first-level and second-level translation information.

23. The computer program product according to claim 22, wherein the computer readable program when executed on a computer causes the computer to provide first-level translation information for translating a virtual address to a pseudo physical address.

24. The computer program product according to claim 22, wherein the computer readable program when executed on a computer causes the computer to provide second-level translating information for translating a pseudo physical address to a machine address.

25. The computer program product according to claim 22, wherein the computer readable program when executed on a computer causes the computer to allocate a portion of a legacy address field for identifying a consumer associated with the direct memory access request.

* * * * *